United States Patent [19]
Zirlin

[11] 3,832,475
[45] Aug. 27, 1974

[54] PREVENTION OF CRYSTALLIZATION OF SPARINGLY SOLUBLE FLAVONOIDS IN FOOD SYSTEMS

[75] Inventor: Amnon Dov Zirlin, Haifa, Israel

[73] Assignee: Centre for Industrial Research (CIR) Ltd., Haifa, Israel

[22] Filed: Sept. 7, 1972

[21] Appl. No.: 286,987

[30] Foreign Application Priority Data
Oct. 22, 1971  Israel.................................... 37995

[52] U.S. Cl. .......... 426/365, 252/363.5, 260/210 F, 426/190, 426/321
[51] Int. Cl............................................. A23l 1/00
[58] Field of Search.......... 99/28, 78, 141 R, 140 R, 99/105; 260/210 F; 424/180; 252/363.5; 426/190, 221, 365, 321

[56] References Cited
UNITED STATES PATENTS

| | | | |
|---|---|---|---|
| 3,037,975 | 6/1962 | Cohn.................................. | 99/140 R |
| 3,183,099 | 5/1965 | Schultz et al. ..................... | 99/141 R |
| 3,248,226 | 4/1966 | Stewart, Jr............................. | 99/78 |
| 3,298,838 | 1/1967 | Villarreal.............................. | 99/78 |

*Primary Examiner*—S. Leon Bashore
*Assistant Examiner*—William F. Smith
*Attorney, Agent, or Firm*—Browdy and Neimark

[57] ABSTRACT

A method for prevention of crystallization of sparingly soluble flavonoids in acidic soft drinks is described. The method consists in the preparation of a uniform dry mixture of the flavonoid with sucrose and heating the dry mixture to a caramel melt stage. This treatment results in an increase of four fold of the flavonoid solubility in acidic soft drinks, without substantial change in the organoleptic property of the flavonoid.

6 Claims, 2 Drawing Figures

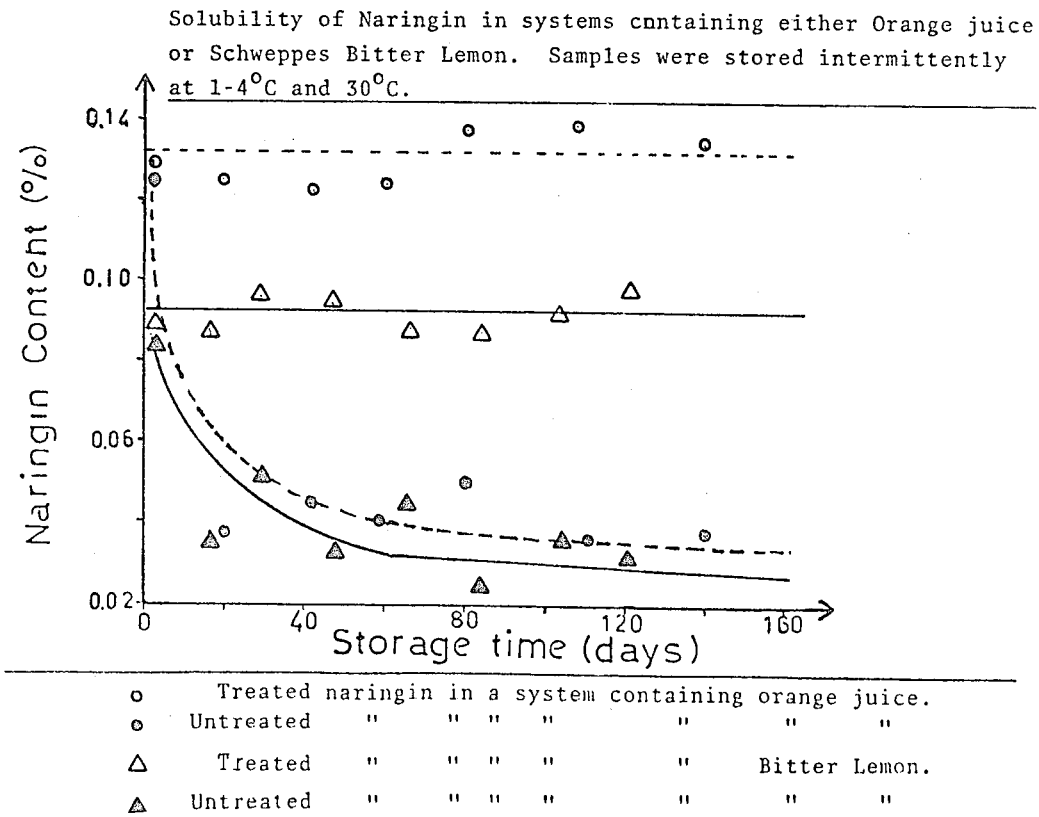

Solubility of Naringin in systems containing either Orange juice or Schweppes Bitter Lemon. Samples were stored intermittently at 1-4°C and 30°C.

o    Treated naringin in a system containing orange juice.
⊙    Untreated    "    "  "   "       "         "       "
△    Treated      "    "  "   "       "       Bitter Lemon.
▲    Untreated    "    "  "   "       "         "       "

Fig. 1: Solubility of Naringin in systems containing either orange juice or Schweppes Bitter Lemon at 1-4°C.

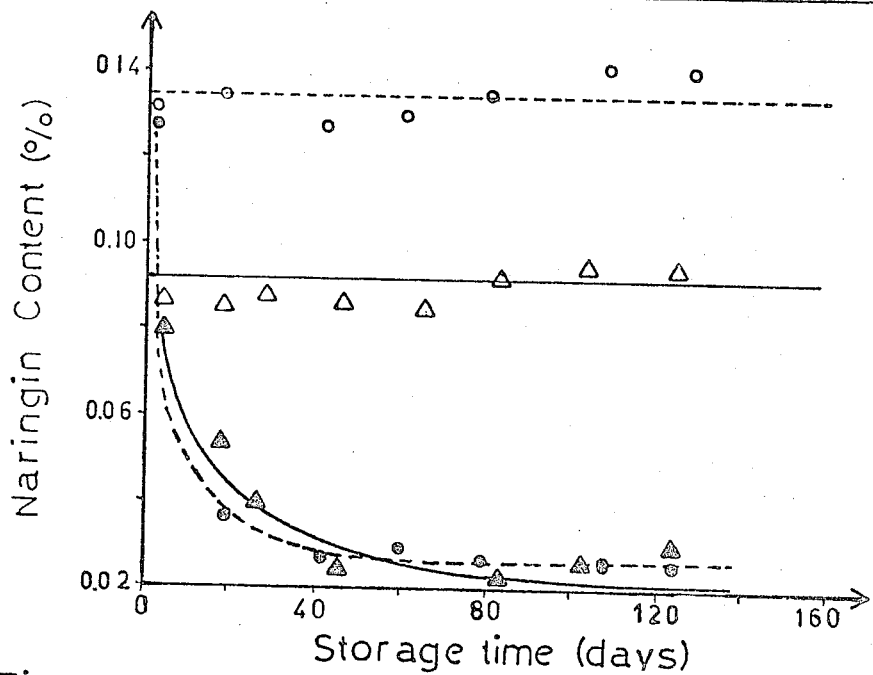

Fig. 2: Solubility of Naringin in systems containing either Orange juice or Schweppes Bitter Lemon. Samples were stored intermittently at 1-4°C and 30°C.

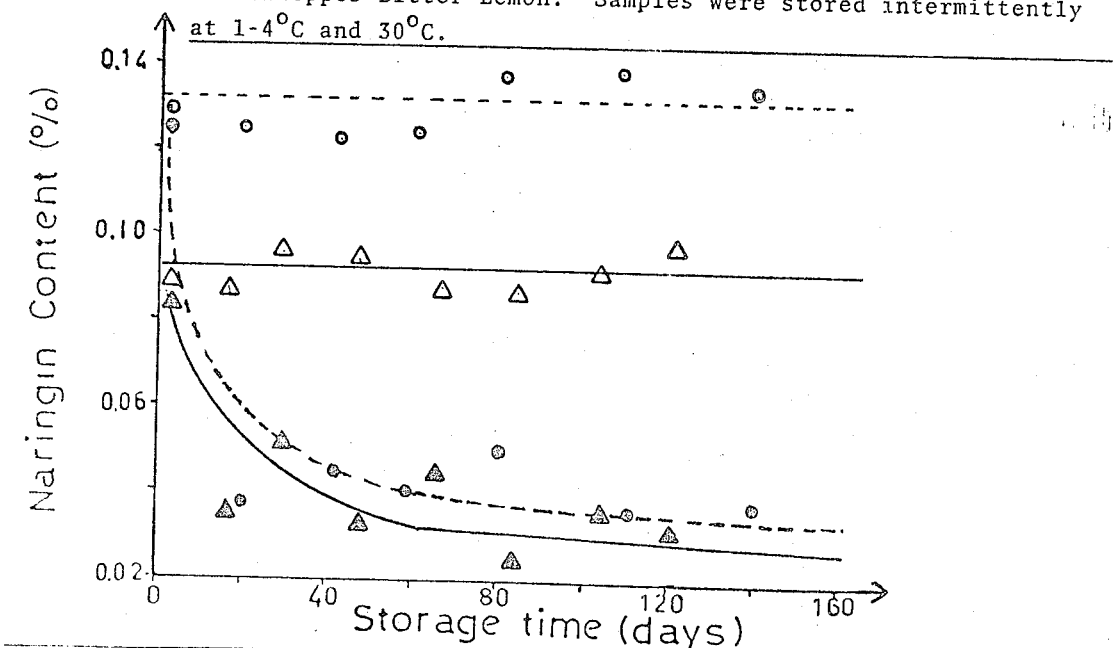

| | | |
|---|---|---|
| ○ | Treated naringin in a system containing orange juice. |
| ⊙ | Untreated " " " " " " " |
| △ | Treated " " " " " " Bitter Lemon. |
| ▲ | Untreated " " " " " " " |

PREVENTION OF CRYSTALLIZATION OF SPARINGLY SOLUBLE FLAVONOIDS IN FOOD SYSTEMS

This invention relates to a method of prevention of crystallization of sparingly soluble flavonoids in food systems. Though the invention has a wide application and can be generally used for various food systems it has an especial importance for soft drinks.

Examples of sparingly soluble flavonoids used in food systems are naragin, rutin, hesperidin etc. In addition to their low solubility in aqueous systems, these flavonoids have a further disadvantage that during storage they crystallize out from the aqueous solutions in which they are dissolved thus reducing even more the flavor action which they impart to the food systems. The prevention of crystallization according to the present invention occurs by improving the solubility of the sparingly soluble flavonoid.

In the food industry, the techniques of improving the solubility of chemicals in aqueous systems have not yet been studied extensively. For example, naringin is a known flavonoid of the glucoside type, present at a relatively high concentration in the blossoms or fruit of the grapefruit. It is very bitter, but its utilizations as a bitter material for flavoring food products such as soft drinks was impeded to a large degree due to its poor solubility in water, and its tendency to crystallize out of the solution.

The methods known from the prior art to improve the solubility of flavonoids in aqueous systems can be divided into three main categories: (a) chemical modifications, (b) formation of complexes and (c) modification of the solvent properties.

Chemical modifications consist in the replacement of hydrogen atoms of hydroxyl groups in the molecule by $-CH_2SO_3H$ group or $-CH_3$ group. The new chemical compounds are characterized by their improved solubility in aqueous systems. However, for the food industry this method is impractical in view of the change in the organoleptic property of the flavonoid. Thus, for example, with naringin this method will cause a sharp decrease in bitterness. Moreover, the feasibility from the health regulations standpoint of adding it to foods has to be established. Thus, though chemical modification constitutes a plausible approach for improving the solubility characteristics of chemicals, both economic and food regulation problems cause the impractibility of this method for many food systems.

Formation of complexes with metals, boric acid, acetic acid and procaine base, have been used for improving the solubility of rutin or hesperidin, both flavonoids used mainly in aqueous pharmaceutical preparations. However, the application of this method to improve the solubility of naringin in soft drinks has been found impractical due to the decreased stability of the complexes in soft drinks. Also, some of the complexes would not be allowed in foodstuffs due to some organoleptic or toxic effects.

Modifying the solvent properties means the use of hydrotropic substances such as mineral bases or salts of benzoic acid and salicylic acid in the system. The hydrotropy phenomena is a result of the increase in the solvent power of water toward other molecules resulting from the presence of large amounts of a third compound which dissolves in the water. In view of the fact that they are effective only at high concentrations of the hydrotropic substances, their use in food systems is very unlikely.

The present invention has the object to prevent the crystallization of the sparingly soluble flavonoids in acidic soft drinks by improving their solubility. It is another object of the present invention that the improved solubilization of the sparingly soluble flavonoids should not adversely affect the economic feasibility of their use in food systems and should meet the health regulations requirements. It is still another object of the present invention to improve the solubility of the sparingly soluble flavonoids without substantially modifying the flavor or palatability of the flavonoid.

The invention, therefore, consists in a method for prevention of crystallization of sparingly soluble flavonoids in acidic soft drinks, by improving their solubility in the system, which comprises in combination the steps of: (a) preparation of a uniform dry mixture of the flavonoid with sucrose, (b) heating the dry mixture to a caramel melt stage, and using the said treated mixture after dilution in acidic soft drinks.

The step (a) has to result in an intimate uniform dry mixture. This can be preferably effected by dissolving the flavonoid and sucrose in water or a mixture of water and organic solvent and subsequently drying. Thus, for the naringin-sucrose system, water alone was used for its complete dissolution. For hesperidin and sucrose a pyridine-water 3:1 (by volume) was used; whereas for rutin a solution of 75 percent methanol and 25 percent water was used for a complete dissolution. The solution was, after that, evaporated and dried at 40°–95°C under reduced pressure. Another method to obtain the uniform dry mixture is dry blending for a prolonged period of time. The sucrose to be used for this treatment may be of any kind such as glucose, fructose, maltose, corn syrup or lactose. Also, surcrose in the state of a syrup, known as "liquid sugar" may be successfully used.

The ratio between the sucrose and the material sparingly soluble in water to be used according to this method in order to improve the solubility, is not critical. Any ratio between 0.5 to 10 parts sucrose to one part flavonoid may be used in obtaining the uniform mixture. Preferably this ratio is between 3–5 parts sucrose to one part flavonoid.

The step (b) is the essential feature in the method of this invention. It consists in heating the dry mixture obtained from the previous step to obtain the caramelization of the sucrose as a melt. This heating is preferably done for flavonoids-sucrose systems under reduced pressure which gives rise to bubbling thus resulting in a uniform treatment. A person skilled in the art will choose any suitable expedient to achieve this purpose. The temperature at which this caramel melt is heated is between 100°C and 200°C and preferably 140°C to 185°C. The caramel melt is kept at this temperature for 5–30 minutes and preferably 10–25 minutes.

The extent of the solubility improvement was found to depend upon the duration of heating and the temperature of the thermal treatment. Thus, it was found that the higher the temperature at which the melt is heated in the above range and the longer the duration of the thermal treatment, the higher was the solubility of the product.

The exact mechanism which will explain the reason for the improvement of the solubility is not yet fully understood. Generally, in solubilization there are a number of mechanisms involved; in some cases one mechanism may predominate whereas in others, several may be involved. It would appear that the reason for the improvement in the solubility according to the present method, is a result of interaction which occurs at the temperature between 140°–185°C, between the flavonoid and chemical species obtained from sucrose during its caramelization.

The basic chemical and physical reactions taking place during the caramelization of sugar are complex and according to the literature, are still not fully understood. But it is known that during the sugar caramelization a breakdown and some polymerization of sugar occurs. It seems that at this stage these sucrose-derived chemical species react at the high temperature with the flavonoids, giving rise to the improvement of their solubility.

The improvement of the solubility was achieved only when the mixture of flavonoid and sucrose is heated together. When sucrose and flavonoids are heated separately and mixed, no improvement in the flavonoid solubility is observed.

After the thermal treatment, the caramel melt is either dissolved in water, preferably hot water, and used in the desired food systems, or kept, such as in a closed vessel, being dissolved in water to the desired concentration before its use.

The method according to the present invention is useful, in general, for various acidic food systems where the problem of dissolution of the sparingly soluble flavonoids is involved. It has a special importance for acidic soft drinks where the tendency of crystallization of the flavonoid is more pronounced. The stability of the colloidally dispersed materials in soft drinks affects considerably, the quality of the products. The reason is that these materials contribute to the flavor, color appearance and texture of the soft drinks. It was found that naturally suspended particles accelerate even more this crystallization.

In systems not undergoing pasteurization, crystallization occurred after a few days, whereas in systems after pasteurization in a first stage supersaturation appeared and only a few days later, the flavonoid crystallized out.

The method according to the present invention has the following advantages:

1. No substantial change in the organoleptic property of the flavonoid occurs.
2. The method is quite simple and it does not involve any complicated chemical procedure.
3. The method results in a quite remarkable improvement in the solubility of the sparingly soluble compound in the aqueous systems, preventing its crystallization.

FIGS. 1 and 2 illustrate quite clearly the extent to which crystallization of naringin in acidic soft drinks is prevented. As a result, the solubility of treated naringin has been four-fold higher than that of untreated naringin, following 3-4 months storage under refrigeration.

The invention is illustrated by the following Examples to which it is not limited.

Example 1

3 g crude naringin and 15 g sucrose were dissolved in 20 ml water at about 80°C. The flask containing the solution was immersed in a boiling water bath and the solution was dried under a reduced pressure (achieved by an aspirator). The flask was connected to a vacuum pump, (of about 0.2 mm Hg) and then immersed in an oil bath at 180°C for 25 minutes. The caramel melt thus obtained was dissolved in 25 ml hot water. An aliquot containing about 100 mg naringin was diluted to 75 ml with water and then 25 ml of sucrose-citrate buffer, pH 3.2 (containing 6% citric acid and 20 percent sucrose) were added.

A blank was prepared by dissolving 100 mg untreated, crude naringin in 75 ml water and then adding 25 ml of the sucrose-citrate buffer, pH 3.2.

After a four month storage under refrigeration (1°–4°C), naringin concentration in the blank dropped to a value of 0.015 percent, while in systems containing the sucrose-naringin caramel melt, naringin content stayed at a constant level of about 0.1%. Naringin determinations were made using Davis' method. (Determination of the flavanones in citrus fruits. Ind. and Eng. Chem. — Analytical Edition — 19,476 (1947)).

Treated and untreated naringin were analyzed using thin layer chromatography (TLC) techniques as follows. A silica gel G (Merck) suspension was applied to carrier plates, and the plates were kept at ambient temperature for at least 24 hours before using them. 2.5 microliter aliquots of 0.2 percent aqueous solutions of treated and untreated naringin were applied to the plates. A solvent mixture consisting of ethyl acetate: methyl ethyl ketone: formic acid: water 5:3:1:1 (by volume) was used for developing the plates. After drying, the chromatograms were sprayed with a 5 percent sodium carbonate solution, followed by drying for 15 minutes at 100°C. The chalcones formed were viewed under ultraviolet light. The plates whre then sprayed once more with a reagent containing diazotized sulphanilic acid (which visualizes phenolic groups). The results of these analyses were as follows: both treated and untreated naringin showed a single, intensely colored spot, having a $R_F$ value of approximately 0.6, and a streak lagging behind the spot. Thus, TLC analyses indicated that no substantial chemical changes occurred in naringin resulting from the treatment effecting an improvement in the solubility of the flavonoid.

Example 2

Sucrose-naringin caramel melt was prepared as described in Example 1.

Aliquots containing about 500 mg of the treated naringin were diluted to 50 ml of water and then transferred to 500 ml volumetric flasks. Similarly, 50 ml aliquots of 1% solution of untreated naringin were transferred to 500 ml volumetric flasks as blank experiment.

The ingredients added to the various systems per 500 ml final product (in addition to 50 ml of a 1 percent solution of either treated or untreated naringin) are listed in Table 1.

TABLE 1

A list of ingredients added to the various systems

| System | Ingredients |
|---|---|
| Schweppes soft drink Bitter lemon | 450 ml Schweppes Bitter Lemon Jafora, Rehovot |
| Schweppes soft drink Golden Orange | 450 ml Schweppes Golden Orange Jafora, Rehovot. |
| Orange drink | 165 ml of a freshly extracted |

TABLE 1-Continued

A list of ingredients added to the various systems

| System | Ingredients |
|---|---|
| | orange juice. |
| | 85 ml sucrose-citrate buffer |
| | pH 3.2* |
| | 200 ml water |

*The sucrose-citrate buffer pH 3.2 contained 6% citrate and 20% sucrose.

The final solutions contained about 0.1% naringin.

The drinks thus obtained were transferred to culture test-tubes and pasteurized by heating at 70°C for 12 minutes. The samples were then stored for 4 months under refrigeration, or intermittently under refrigeration and at 30°C. Naringin content in the blanks dropped to 0.025–0.035 percent while in systems containing the caramel melt, the flavonoid concentration remained constant at a level of 0.1 percent.

Example 3

Dry mixtures containing 100 mg naringin (recrystallized from isopropyl alcohol) and 1,000,500,300,200, 100 or 50 mg sucrose were prepared, using the technique described in Example 1. The mixtures were heated for 20 minutes at 180°C. The caramel melts obtained in this way were dissolved in 75 ml water and 25 ml of a sucrose-citrate buffer, pH 3.2, (containing 20% sucrose and 6% citrate) were added. The solutions were stored under refrigeration for about three months. Data on naringin contents at the end of the storage are given in Table 2. The result of the experiment prepared under the same conditions with untreated naringin (blank) is also given.

TABLE 2

Naringin content after a 3-months storage at 1–4°C

| Weight ratio of sucrose to naringin | Naringin content (%) |
|---|---|
| 0.5 | 0.025 – 0.03 |
| 1 | 0.025 – 0.035 |
| 2 | 0.04 – 0.05 |
| 3 | 0.07 |
| 5 | 0.08 – 0.09 |
| 10 | 0.08 – 0.09 |
| Blank | 0.015 |

The data presented in Table 2 indicated that the decreasing of the weight ratio of sucrose to naringin to values lower than 3 resulted in a reduced solubility improvement, while increasing the ratio to values higher than 5 did not change the effectiveness of the treatment.

Example 4

A dry mixture containing 100 mg naringin (recrystallized from isopropyl alcohol) and 1,000 mg of a corn syrup D.E. 60 (marketed by Deutsche Maizena Werke, Hamburg, W. Germany, under the commercial name "Puritose 1631") was prepared and then heated for 20 minutes at 180°C under reduced pressure (0.2 mm Hg). The caramel melt was dissolved in 75 ml water, and 25 ml of a sucrose-citrate buffer pH 3.2 — (containing 20 percent sucrose and 6 percent citrate) were added. A blank, containing 100 mg naringin and 1,000 mg "Puritose 1631" in 100 ml of a buffered solution, was prepared. The systems were stored under refrigeration for three months.

Following the 3-months storage period, naringin content of the systems containing untreated and treated naringin were, 0.02 percent and 0.09 percent respectively.

Example 5

Mixtures containing 100 mg rutin and 500 mg sucrose were dissolved in a solvent mixture consisting of 3 ml methyl alcohol and 0.5 ml water. The solvent was evaporated over a boiling water bath and the traces of solvent were removed by applying high vacuum (0.5 mm Hg). The single phase solid mixtures thus obtained were heated under reduced pressure (400 microns Hg) for 20 minutes at a temperature of 170°C, 160°C, and 150°C. The caramel melts were dissolved in 75 ml hot water and then 25 ml of a sucrose-citrate buffer, pH 3.2 (containing 20 percent sucrose and 6% citrate) were added. Blank solutions were prepared by dissolving 100 mg rutin and 500 mg sucrose in 75 ml boiling water and then adding 25 ml of the buffer. The samples were stored under refrigeration. After a four-months storage, rutin content of the various samples were determined using Davis' method; the results are compiled in Table 3.

TABLE 3

Rutin content after a 4-months storage at 1–4°C

| Temperature during the thermal treatment (°C) | Rutin content (%) |
|---|---|
| 150 | 0.035 |
| 160 | 0.05 |
| 170 | 0.085 |
| Blank (untreated rutin) | 0.005 |

Thin layer chromatography analyses (which were carried out using the techniques described in Example 1) indicated that no substantial chemical change occurred in the treated flavonoid.

The data (Table 3) also indicated that when sucrose-rutin mixtures were heated at temperatures in the range of 150°–170°C, the higher the temperature the better was the improvement in solubility.

Example 6

100 mg hesperidin and 500 mg sucrose were dissolved in a boiling solvent mixture consisting of 20 ml pyridine and 2 ml water. The hot solution was filtered and the solvent was evaporated at 90°–95°C under reduced pressure. The dry mixture was heated at 180°C under reduced pressure (150 microns Hg), for 20 minutes.

After three-months storage period under refrigeration, hesperidin content of the systems containing treated or untreated flavonoids were about 0.09 and 0.01 respectively.

I claim:

1. A method for prevention of crystallization of sparingly soluble flavonoids in acidic food systems, by improving their solubility in the system, which comprises the steps of:

a. preparing a uniform dry mixture of the flavonoid with sucrose, said mixture comprising 0.5 to 10 parts sucrose to one part flavonoid;

b. heating the dry mixture at a temperature range of 140° – 185°C. for 5 – 30 minutes to a caramel melt stage;
c. dissolving the heated mixture in water; and
d. adding the solution to an acidic food system.

2. A method according to claim 1 where the said preparation of the uniform dry mixture is performed by the dissolving of the components in an aqueous system and evaporating the water to obtain the dry mixture.

3. A method according to claim 2 wherein three to five parts sucrose to one part of flavonoid are used in said preparing step.

4. A method according to claim 1 where said heating is done for 10 to 25 minutes.

5. A method according to claim 1 where the said sparingly soluble flavonoid is naringin, hesperidin or rutin.

6. A method according to claim 1 wherein said acidic food system is an acidic soft drink.

* * * * *